United States Patent [19]

Kawakura

[11] Patent Number: 5,973,676
[45] Date of Patent: Oct. 26, 1999

[54] INPUT APPARATUS SUITABLE FOR PORTABLE ELECTRONIC DEVICE

[75] Inventor: Yasushi Kawakura, Kanagawa-ken, Japan

[73] Assignee: Kabushiki Kaisha Toshiba, Kawasaki, Japan

[21] Appl. No.: 08/594,376

[22] Filed: Jan. 30, 1996

Related U.S. Application Data

[63] Continuation of application No. 08/269,211, Jun. 30, 1994, abandoned.

[30] Foreign Application Priority Data

Jun. 30, 1993 [JP] Japan .................................. 5-186727

[51] Int. Cl.$^6$ .................................................. G09G 5/00
[52] U.S. Cl. ........................................... 345/173; 345/174
[58] Field of Search .................................... 345/156, 173, 345/174, 178, 179

[56] References Cited

U.S. PATENT DOCUMENTS

| | | | |
|---|---|---|---|
| 4,947,156 | 8/1990 | Sato et al. | 178/18 |
| 4,952,051 | 8/1990 | Lovell et al. | 345/122 |
| 5,018,208 | 5/1991 | Gladstone | 382/13 |
| 5,025,314 | 6/1991 | Tang et al. | 178/18 |
| 5,065,438 | 11/1991 | Hirose et al. | 345/173 |
| 5,231,381 | 7/1993 | Duwaer | 178/18 |
| 5,239,373 | 8/1993 | Tang et al. | 345/179 |
| 5,311,207 | 5/1994 | Kusumoto et al. | 345/173 |
| 5,319,386 | 6/1994 | Gunn et al. | 345/173 |

*Primary Examiner*—Matthew Luu
*Attorney, Agent, or Firm*—Oblon, Spivak, McClelland, Maier & Neustadt, P.C.

[57] ABSTRACT

An input apparatus for a portable electronic device capable of detecting the unintentional erroneous input operations and separating the intended correct input operations effectively. The apparatus includes an input unit for allowing a user to enter inputs by a prescribed input operation, an input movement monitoring unit for monitoring a movement of the user at a time of the input operation and a processing unit for processing the inputs entered at the input unit according to the input operation made by the user at the input unit and the movement of the user monitored by the input movement monitoring unit. The apparatus can be adapted to a pen input type electronic device, a slide control type electronic device, and a button control type electronic device. The movement monitored by the input movement monitoring unit can also be utilized as a control command for controlling the operation of the electronic device.

21 Claims, 11 Drawing Sheets

INPUT APPARATUS SUITABLE FOR PORTABLE ELECTRONIC DEVICE

This is a continuation of application Ser. No. 08/269,211, filed Jun. 30, 1994, now abandoned.

BACKGROUND OF THE INVENTION

1. Field of the Invention

The present invention relates to an input apparatus for entering data, command, etc. in a portable type electronic instrument such as an electronic pocketbook.

2. Description of the Background Art

In recent years, in conjunction with the considerable reduction of sizes of the electronic devices, the portable type electronic devices such as a portable electronic pocketbook have been developed for practical use and becoming popular. Such a portable type electronic device can be operated while holding it in hand or placing it on lap, so that it is operable even in a circumstances in which an ample space for firmly settling it cannot be found, and consequently the potential for its utilization has been increased considerably. As a result, there is an expectation for the utilization of such a portable type electronic device for the so called mobile computing in which a computing device can be carried around all the times and used whenever necessary at wide range of locations.

On the other hand, such a portable type electronic device is associated with a problem that it is difficult to secure the satisfactory handling of the device as it is quite compact and to be operated without being firmly fixed. For instance, in a case of operating it while holding it in hand, there are greater chances for making erroneous operations due to the vibration of the device held in hand. In particular, when the input apparatus adopted in such a portable type electronic device is of a type for entering the handwriting characters or of a type requiring a continuous input operation such as a slide control type, it is prone to have the unintentional movements due to the vibration mixed up with the intended input operations, such that it becomes difficult to separate out the data entered by the intended input operations alone. Moreover, in a case of displaying the data entered by the input operation, the erroneous data entered by the unintentional movements due to the vibration are also going to be displayed, and such erroneous data display may interfere with the correct operations of the device.

In addition, there is a general trend to make such a portable type electronic device even more compact so that the operation units to be operated by a user are also becoming increasingly compact, and consequently there are greater chances for making erroneous operations as there are greater chances for a user to touch the uninterested operation units accidentally.

In the conventional portable type electronic device, such erroneous operations are detected by the scheme in which the propriety of each operation in the input operation procedure is judged by matching with the prescribed checking list. In this scheme, the input operation procedure is detected by the same input means as that used for entering the data.

Now, the erroneous operations occurring in the portable type electronic device can be generally classified into the following two cases. One is a case in which the content entered by the input operation is erroneous despite of the fact that the operation itself is a proper one according to the correct input operation procedure as the user correctly recognizes the input operation procedure. The other one is a case of the unintentional operation made by the user due to the vibration of the device or some other causes.

In order to detect the erroneous operation of the former case, there is a need to utilize a checking list including not Just the correct input operation procedure itself but also the knowledge concerning its semantic contents. Such an error detection scheme requires a highly complicated matching process and it is not easy to compile all the necessary knowledge in advance, so that the use of this scheme is limited to a case in which the highly sophisticated judgement of the errors is demanded regardless of the cost required for its implementation.

As for the detection of the erroneous operation of the latter case, when the input operation procedure is standardized, it can be realized relatively easily by checking whether each operation of the input operation procedure is enlisted on the checking list which contains the entire correct input operation procedure. However, when the types of the possible operations are numerous or when the non-standardized input operations are involved, either the matching process becomes difficult as the checking list takes an enormous size or the construction of the checking list itself becomes practically impossible so that the effective detection of the erroneous operation is not feasible.

Thus, in the conventional portable type electronic device, the correct input operations and the erroneous input operations can be distinguished from each other only in very limited cases.

In particular, in the conventional erroneous operation detection scheme, the judgement of the intentional correct input operation and the unintentional erroneous input operation is based on the analysis of the input data, so that there have been cases in which it cannot be helped but judging it as the intended input operation no matter what it really is, as long as the entered input data is in compliance with the prescribed correct input operation procedure.

SUMMARY OF THE INVENTION

It is therefore an object of the present invention to, provide an input apparatus suitable for a portable electronic device capable of detecting the unintentional erroneous input operations and separating the intended correct input operations effectively.

According to one aspect of the present invention there is provided an input apparatus for entering inputs into a portable electronic device, comprising: input means for allowing a user to enter inputs by a prescribed input operation; input movement monitoring means for monitoring a movement of the user at a time of the input operation; and processing means for processing the inputs entered at the input means according to the input operation made by the user at the input means and the movement of the user monitored by the input movement monitoring means.

According to another aspect of the present invention there is provided a method for entering inputs into a portable electronic device, comprising the steps of: allowing a user to enter inputs by a prescribed input operation; monitoring a movement of the user at a time of the input operation; and processing the inputs entered at the allowing step according to the input operation made by the user at the allowing step and the movement of the user monitored at the monitoring step.

According to another aspect of the present invention there is provided a portable electronic device, comprising: data input means for entering data into the portable electronic device, including: input means for allowing a user to enter input data by a prescribed input operation; input movement monitoring means for monitoring a movement of the user at a time of the input operation; and processing means for processing the input data entered at the input means according to the input operation made by the user at the input means and the movement of the user monitored by the input movement monitoring means, to obtain appropriately processed input data; and data processing means for processing the appropriately processed input data entered from the data input means.

Other features and advantages of the present invention will become apparent from the following description taken in conjunction with the accompanying drawings.

DETAILED DESCRIPTION OF THE PREFERRED EMBODIMENTS

Figure 1:
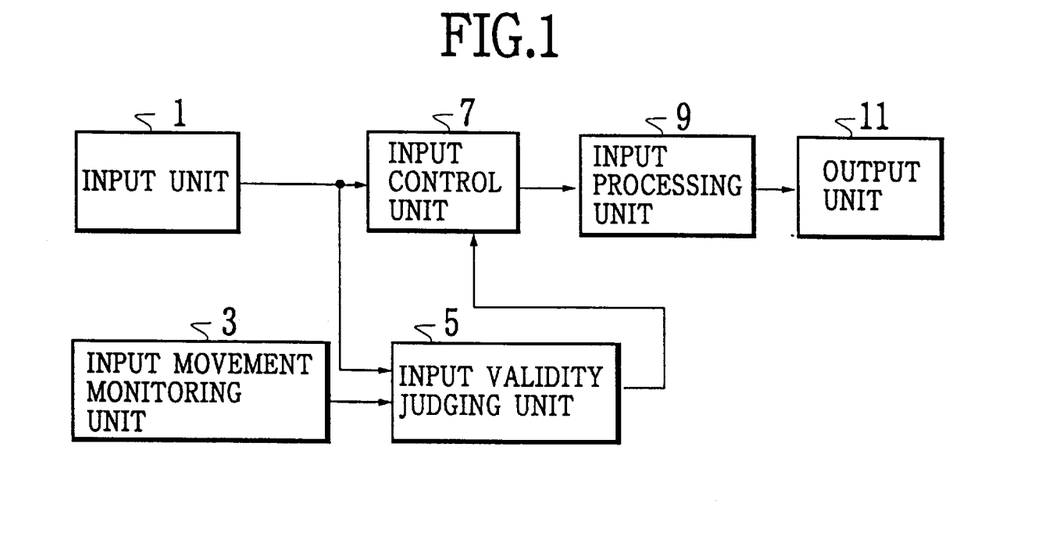
FIG. 1 is a schematic block diagram of the first embodiment of an input apparatus according to the present invention.

Referring now to FIG. 1, the first embodiment of the input apparatus suitable for a portable electronic device according to the present invention will be described in detail.

In this first embodiment of FIG. 1, the input apparatus comprises: an input unit 1 for allowing a user to enter inputs: an input movement monitoring unit 3 for monitoring a movement of the user at a time of entering the inputs at the input unit 1; an input validity judging unit 5 for judging the validity of the inputs entered from the input unit 1 according to the movement monitored by the input movement monitoring unit 3; an input control unit 7 for controlling the flow of the inputs entered from the input unit 1 to cancel those inputs which are judged as invalid by the input validity judging unit 5; an input processing unit 9 for applying required data processing such as the character recognition onto the valid inputs passed by the input control unit 7; and an output unit 11 for outputting the appropriately processed valid inputs obtained at the input processing unit 9 for further manipulation of these inputs in a portable electronic device.

In this configuration, the input movement monitoring unit 3 for monitoring the movement of the user at a time of entering the inputs such as the user's input operation movement is provided in a vicinity of the input unit 1 by being placed around the input unit 1 or in superposition to the input unit 1. The input movement monitoring data obtained by this input movement monitoring unit 3 is then utilized in combination with the input data entered from the input unit 1 at the input validity judging unit 5 to judge whether the input operation movement is a proper one or not, so as to detect the erroneous input movements different from the normal input operation movements.

Figure 2:
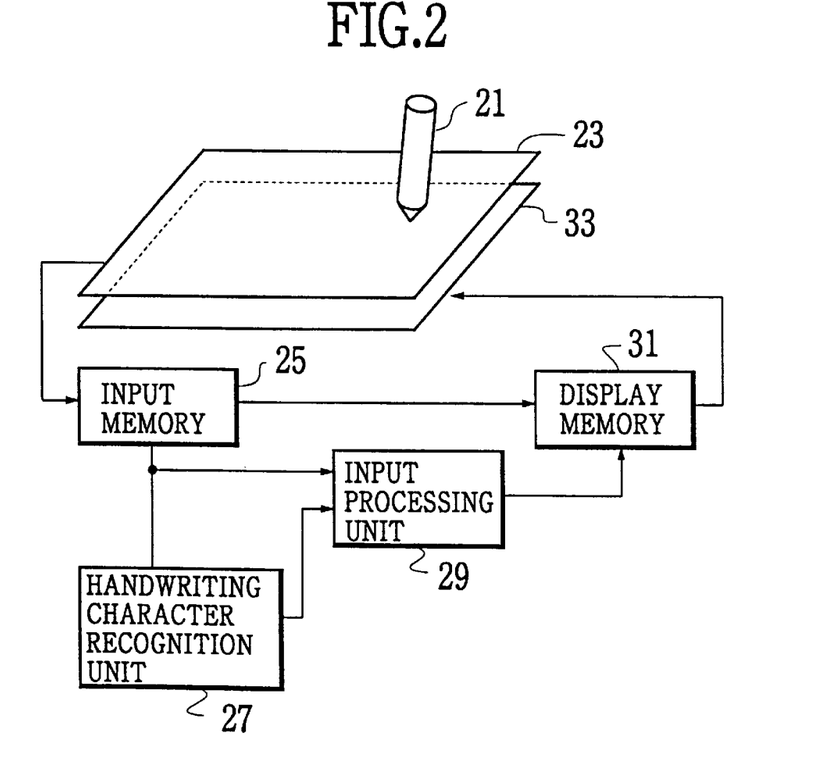
FIG. 2 is a schematic block diagram of a pen input type electronic device incorporating the input apparatus of FIG. 1.
Figure 3:
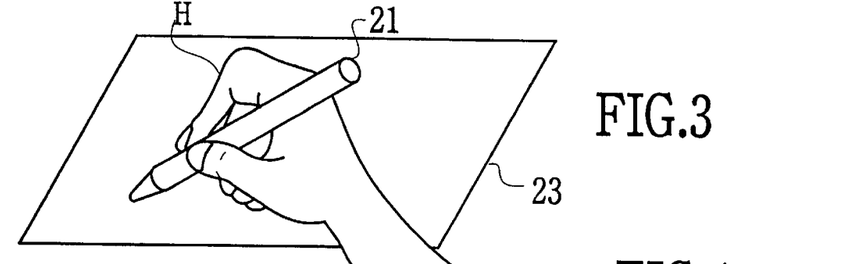
FIG. 3 is an illustration of a manner in which the handwriting input is entered in the pen input type electronic device of FIG. 2.

As an illustrative example, FIG. 2 shows an exemplary configuration in which the input apparatus of this first embodiment is adapted to a pen input type computer. In this pen input type computer of FIG. 2, the inputs in forms of characters are entered by using an input pen 21 on an input screen 23 in a manner of ordinary handwriting using a pen as illustrated in FIG. 3 by being held in hand H. The input characters entered at the input screen 23 are temporarily stored in an input memory 25, and recognized at a handwriting character recognition unit 27, and then applied with required data processing at an input processing unit 29. The input characters stored in the input memory 25 and the processed input data obtained by the input processing unit 29 are then stored in a display memory 31, and displayed at a display unit 33 provided in superposition to the input screen 23.

Here, the input pen 21 is preferably in a shape of a usual writing instrument, and may be electrically connected with the main body of the computer. The input screen 23 in this case can be provided by a screen equipped with a matrix shaped array of transparent electrodes. The display, unit 33 in this case can be any desired display device such as CRT (Cathode Ray Tube), LCD (Liquid Crystal Display), EL (Electroluminescence) device, etc.

Now, the operation of this pen input type computer of FIG. 2 will be explained. As already mentioned, if it is possible to operate this pen input type computer in a moving vehicle, the operable range of this pen input type computer can be enhanced considerably and the full advantage of its portability can be taken. Although it is not entirely impossible to use the conventional pen input type computer in this manner, it is actually very difficult to operate it properly under the vibrating circumstance so that the satisfactory handling under such a circumstance could not have been realizable.

Figure 4:
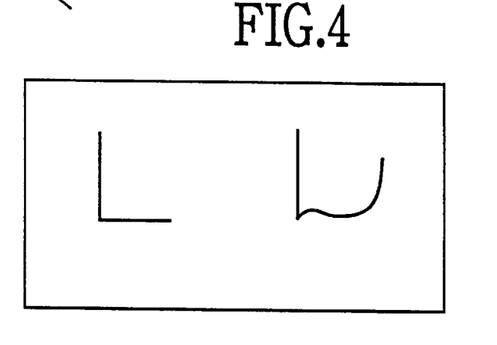
FIG. 4 is an illustration of an exemplary correct input and a corresponding exemplary erroneous input that can be entered in the pen input type electronic device of FIG. 2.

For example, the trouble arises from the fact that it is impossible to judge whether an input operation is an intended one or an unintentional one while there are many instances at which the pen point cannot be controlled stably as intended. Namely, as shown in FIG. 4, while intending to enter a character "L" as illustrated on left half of FIG. 4, the erroneous input illustrated on right half of FIG. 4 can be entered due to the vibration. In such a case, this erroneous input operation cannot be distinguished from that of the correct input operation procedure, so that it is highly likely for this erroneous input to be recognized as the valid input character of "U" or "v" or some other character, depending on the property of the handwriting character recognition unit used. Here, by simply analyzing the trace of the pen point or the stroke power, it is impossible to judge whether it is an intended input of "U" or an unintentional erroneous input of "L" deformed to appear as "U".

Here, in a case of the unintentional erroneous input of "L" deformed to appear as "U", this deformation is caused by the unintentional input movement added to the trace of the pen point, so that this unintentional erroneous input can be detected if the presence of the unintentional input movement can be detected. In the pen input type computer adopting the input apparatus of the first embodiment, this detection of the presence of the unintentional input movement is achieved by the input movement monitoring unit 3 of FIG. 1. This operation of the input movement monitoring unit 3 will now be described in further detail.

Figure 5A:
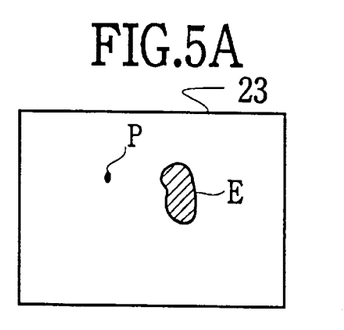
FIGS. 5A and 5B are illustrations of a pen point of the pen and a contacting face of the hand monitored by the pen input type electronic device of FIG. 2.
Figure 5B:
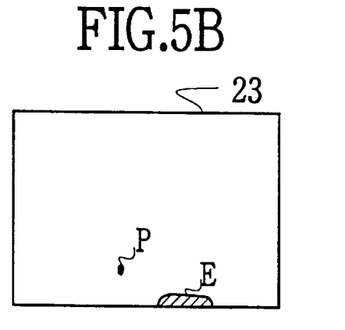

Normally, in order to stabilize the pen point at a time of writing a character, it is effective to stabilize the hand holding the pen. In a case of writing a character by pen on a paper placed horizontally flat, the pen point is stabilized as a result of stabilizing the hand holding the pen by putting the hand holding the pen on the paper while touching the paper by the pen point. Without stabilizing the hand holding the pen, it is difficult to write the easily recognizable character. This fact is equally valid for a case of inputting a character by the input pen 21 of the pen input type computer of FIG. 2, so that the easily recognizable character can be written as intended by putting the hand H holding the input pen 21 in a vicinity of input region on the input screen 23 while touching the input region on the input screen 23 by the pen point of the input pen 21. Here, the relationship between the positions of the pen point P of the input pen 21 and a contacting face E of the hand H on a surface of the input screen 23 appear as shown in FIG. 5A in a case of writing at an approximately middle region of the input screen 23, or as shown in FIG. 5B in a case of writing near a lower edge of the input screen 23 in which case the contacting face E has a reduced area as a space available for putting the hand H has narrowed.

In a case of writing a plurality of characters, the position of the hand holding the pen is not moved while a character is written by moving the pen point. The hand holding the pen is moved when the writing of one character has finished and it proceeds to the writing of the next character, or when the writing of a grouped portion of a character such as a radical of the Chinese character has finished and it proceeds to the writing of the remaining portion of that character. However, in a circumstance in which the entire body of the user is shook as in a case of operating the pen input type computer in a moving vehicle, the hand holding the pen can also unintentionally move while writing the character by the pen. Of course, there are cases in which the hand holding the pen can stay unmoved despite of the shaking of the user's body, but such a mild shaking is going to cause hardly any deformation on the character in process of being written and therefore it is practically ignorable.

In accordance with the above analysis of the character writing in general, the erroneous input operation for the handwriting character input due to the shaking in a moving vehicle is detected in this first embodiment as follows.

Figure 6:
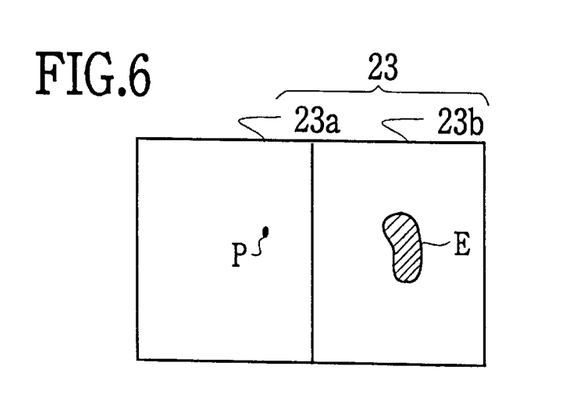
FIG. 6 is an illustration of a manner of monitoring a, pen point of the pen and a contacting face of the hand in the pen input type electronic device of FIG. 2.

Namely, in this case, as shown in FIG. 6, the input screen 23 in the configuration of FIG. 2 can be effectively divided into two parts, including a pen part 23*a* in which the pen point P of the input pen 21 is located and a hand part 23*b* in which the contacting face E of the hand H is located. In a case of the right handed user who holds the input pen 21 in his right hand, the left side is going to be the pen part 23*a* and the right side is going to be the hand part 23*b* as shown in FIG. 6. Then, the pen part 23*a* can function as the input unit 1 of the input apparatus of FIG. 1 from which the input data can be obtained by detecting the movement of the pen point P, while the hand part 23*b* can function as the input movement monitoring unit 3 of the input apparatus of FIG. 1 from which the input movement monitoring data can be obtained by detecting the movement of the contacting face E of the hand H. Here, the sensing mechanism for detecting the movement of the pen point P in the input unit 1 and the sensing mechanism for detecting the movement of the contacting face E in the input movement monitoring unit 3 can be identical, or different if desired.

In practice, the sensing mechanism for detecting the movements of the pen point P and the contacting face E by distinguishing the pen and the hand can be realized as follows.

Figure 7:
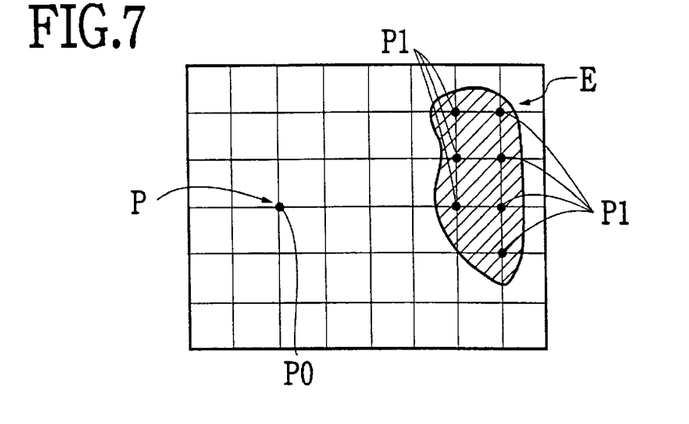
FIG. 7 is an illustration of an array of two-value pressure sensors that can be used in monitoring a pen point of the pen and a contacting face of the hand in the pen input type electronic device of FIG. 2.

Namely, an array of two-value pressure sensors can be provided in superposition to the input screen 23 as shown in FIG. 7. In this case, this sensing mechanism obtains the data concerning the presence or absence of the pressure on lattice points and its distribution, and an isolated pressure point P0 having no neighboring pressure points is judged as the pen point P of the input pen 21, while distributed pressure points P1 having neighboring pressure points are judged as the contacting face E of the hand H as indicated by the shaded region in FIG. 7.

Figure 8:
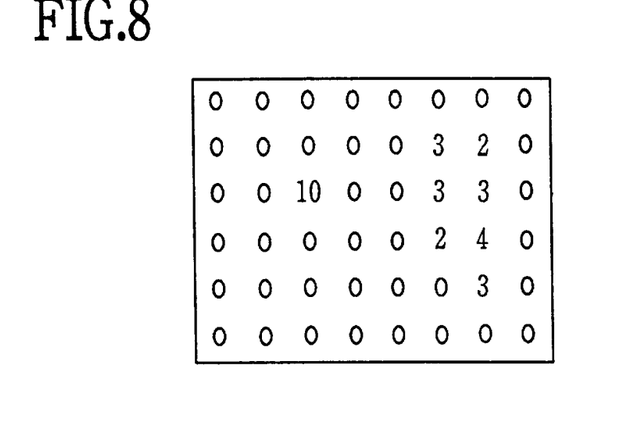
FIG. 8 is an illustration of an array of multi-value pressure sensors that can be used in monitoring a pen point of the pen and a contacting face of the hand in the pen input type electronic device of FIG. 2.

Also, an array of multi-value pressure sensors can be provided in superposition to the input screen 23 as shown in FIG. 8. In this FIG. 8, the arrays of numerals indicate the sensed pressure levels at lattice points, where a larger numerical value indicates the stronger pressure. In this case, a pressure point having a pressure level difference with respect to the neighboring lattice points greater than a prescribed threshold is judged as the pen point P of the input pen 21, while pressure points having a pressure level difference with respect to the neighboring lattice points not greater than the prescribed threshold are judged as the contacting face E of the hand H.

Figure 9:
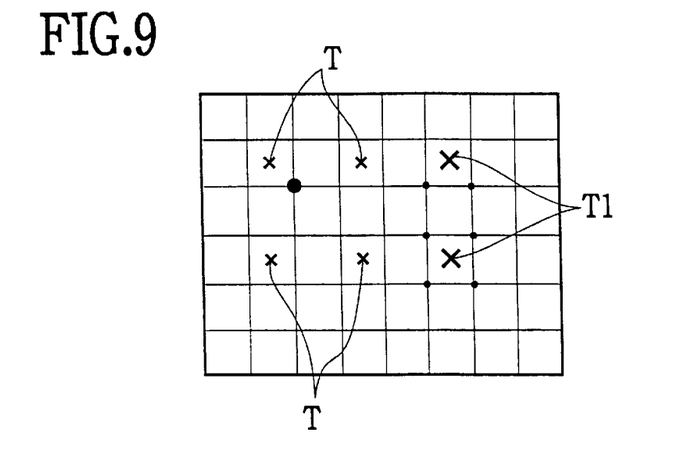
FIG. 9 is an illustration of a combination of an array of pressure sensors and an array of temperature sensors that can be used in monitoring a pen point of the pen and a contacting face of the hand in the pen input type electronic device of FIG. 2.

Alternatively, as shown in FIG. 9, the array of pressure sensors provided in superposition to the input screen 23 as shown in FIG. 7 or FIG. 8 can be further equipped with an array of sparsely arranged temperature sensors T (indicated by x marks in FIG. 9) which is also provided in superposition to the input screen 23. In this case, the pressure points neighboring those temperature sensors T1 (indicated by bold x marks) which sensed the body temperature are judged as the contacting face E of the hand H, while a pressure point not neighboring those temperature sensors T1 is judged as the pen point P of the input pen 21.

In any of these sensing mechanisms of FIG. 7 to FIG. 9, there is a need to take due consideration for the interference of the sensors of the sensing mechanism with the input elements such as the matrix shaped array of the transparent electrodes constituting the input screen 23.

Figure 10:
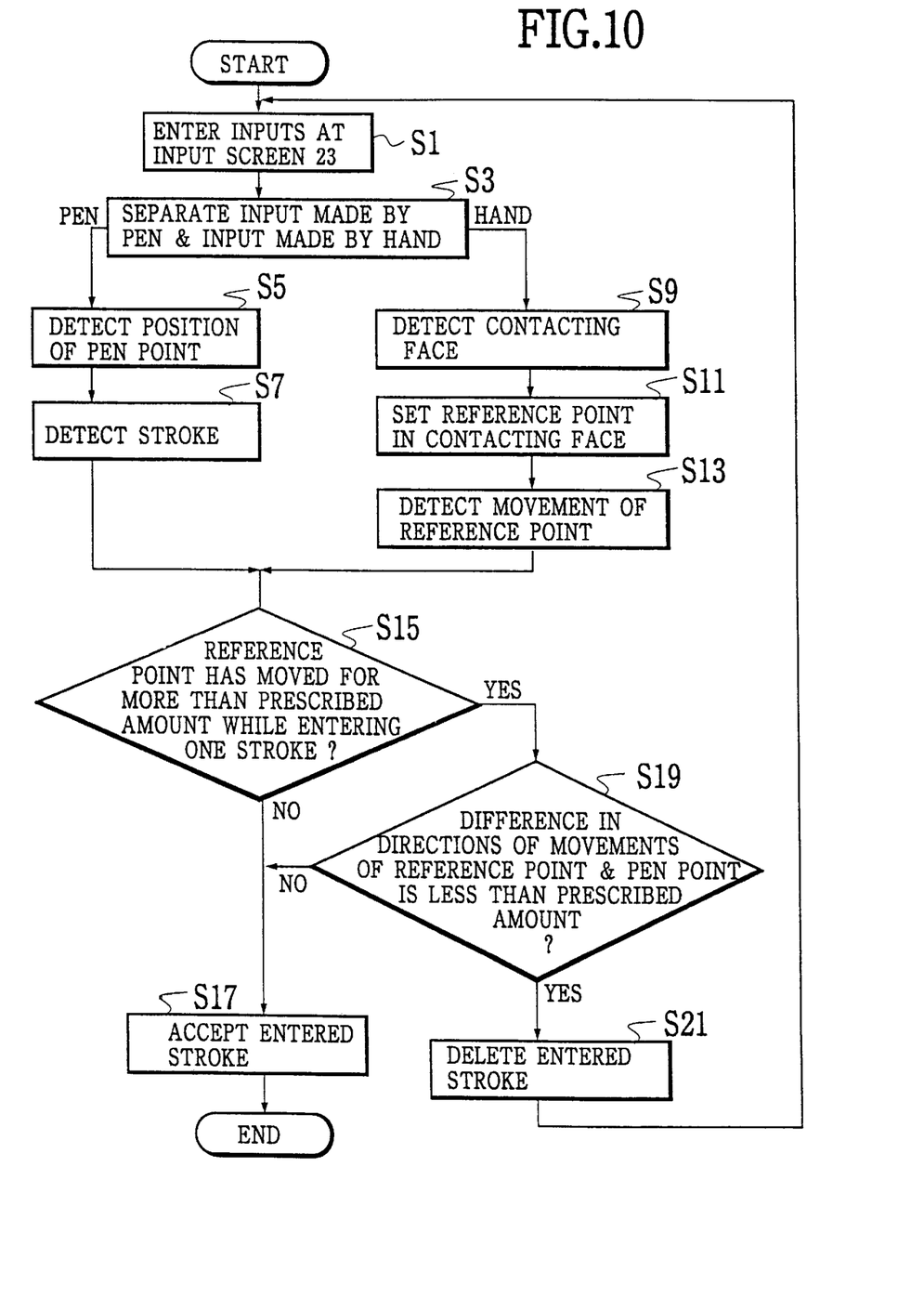
FIG. 10 is a flow chart of a procedure for detecting an erroneous input operation in the pen input type electronic device of FIG. 2.

Then, the input apparatus of this first embodiment in the pen input type computer of FIG. 2 operates according to the flow chart of FIG. 10 as follows.

First, the inputs are entered at the input screen 23 by the input pen 21 and the hand H (step S1). Here, when the continuous inputs are given to the input screen 23, it can be judged as a process for entering an input character.

Figure 11A:
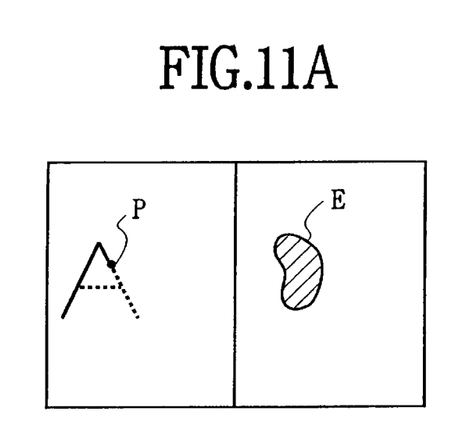
FIGS. 11A, 11B, and 11C are illustrations of exemplary states of entered inputs at various stages in the procedure of FIG. 10.

Then, the inputs given to the input screen 23 is separated into the input made by the input pen 21 and the input made by the hand H, using any of the above described sensing mechanisms of FIG. 7 to FIG. 9 (step S3). At this point, the inputs given to the input screen appears as shown in FIG. 11A, in which the pen point P is in a continuous movement in process of writing a character "A", where the solid line indicates the already written trace of the pen point P while the dashed line indicates the expected remaining part of the trace of the pen point P.

Next, the position of the pen point P is detected (step S5) and the stroke is detected by following the time change of the position of the pen point P (step S7).

Figure 11B:
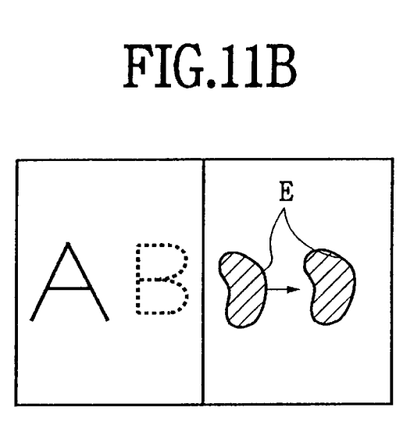

Meanwhile, the contacting face E of the hand H is detected (step S9) as a set of the neighboring pressure points, and an arbitrary point within the detected contacting face E on a side facing toward the user is set as a reference point (step S11). Then, the movement of the reference point is detected by following the time change of the position of the reference point (step S13), so as to detect the movement of the hand H holding the input pen 21. At this point, the input given to the input screen appears as shown in FIG. 11B, in which the writing of the character "A" has finished and a transition to the writing of the next character "B" is taking place such that the contacting face E of the hand H has moved to the right.

Figure 11C:
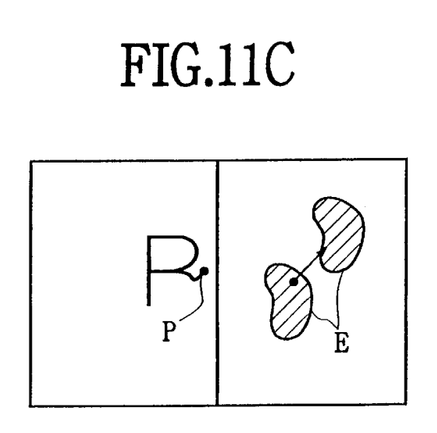

Now, under the vibrating circumstance, it is possible to encounter a case in which the position of the hand H holding the input pen 21 moves while writing the character by the input pen 21 as shown in FIG. 11C in which the contacting face E has suddenly moved toward the upper right corner while writing the second stroke for the character "B". In conjunction with this movement of the hand H, the pen point P has also suddenly moved toward the upper right corner, so as to make the erroneous deformed trace for the intended input character of "B".

In order to detect such an erroneous input operation, whether the reference point has moved for more than a prescribed amount while entering one and the same stroke or not is judged (step S15), and if not, the entered stroke is accepted as a valid one (step S17), whereas otherwise whether a difference between the direction in which the reference point has moved and the direction in which the pen point has moved is less than a prescribed amount or not is judged (S19), and if not, the entered stroke is accepted as a valid one (step S17), whereas otherwise the entered stroke is cancelled as an invalid one and deleted from the input screen 23 (step S21) and the subsequent input is awaited.

Here, if desired, the step S19 may be omitted between the steps S15 and S21, such that the entered stroke is cancelled as an invalid one and deleted from the input screen 23 at the step S21 whenever it is judged that the reference point has moved for more than a prescribed amount while entering the same stroke at the step S15. Note that the step S19 judges a case of the movements of the pen point P and the contacting face E in substantially the same direction as the erroneous input operation, assuming that such parallel movements could not occur in the normal character writing. Whether this judgement is to be incorporated is optional.

Moreover, at the step S21, instead of deleting the entire stroke which is judged as erroneous, it is also possible to correct the entered stroke by subtracting the displacement of the reference point from the entered trace of the pen point, if desired.

Now, an application of the input apparatus of the first embodiment described above for the detection of the border between characters or the border of the radical of the character in the on-line handwriting character recognition processing by using the input movement monitoring data will be described.

Usually, one character comprises more than one strokes, and the detection of each character is made according to the rule that the stroke is always broken off at the border of the character. However, the breaking point of the stroke is not necessarily the border of the character, so that there still remains a need to judge whether the successive strokes in the given time series of the strokes are to be interpreted as parts of a single character or as different characters, which has been quite difficult conventionally.

For this reason, in the conventional input apparatus, the input screen is provided with character frames and the user is urged to enter each character within each character frame such that the border of the character can be specified clearly. As a result, when even a part of the entered character sticks out of the character frame, the recognition of the entered character becomes impossible.

In this regard, the input apparatus according to the first embodiment described above can be utilized according to the property that the position of the reference point in the contacting face of the hand holding the pen does not move while writing one and the same character, by detecting the position of the reference point at the input movement monitoring unit 3 of FIG. 1.

In this case, the input apparatus of the first embodiment can be adapted to operate according to the flow chart of FIG. 12 as follows. Here, the steps S1 to S13 are identical to those in the flow chart of FIG. 10, so that their description will be omitted.

After the steps S7 and S13, whether the reference point has moved between the end of the last stroke and the start of the current stroke or not is judged (step S25), and if not, it is judged that the input of the same character is still continuing, whereas otherwise this break off of the stroke is judged as the border of the character (step S29), and the resulting stroke sequence for one character is sent to the character recognition process (step S31).

Here, it is to be noted that there are cases in which the borders of the characters can be uniquely determined by the character recognition using the input data alone, and the detection of the border using the input movement monitor data as described above is utilized only when there is an ambiguity as to the interpretation of the borders of the characters.

It is also to be noted that the hand holding the pen also may not be moved while writing a plurality of characters in very small sizes, whereas the hand holding the pen may be moved from one stroke to another for one and the same character while writing the character in a very large size. Consequently, the above described application is particularly effective when the characters are to be written in the usual or slightly larger than usual sizes, or when the characters are to be written with wide gaps.

For this reason, it is still preferable to provide guide lines or character frames on the input screen in order to specify the suitable sizes of the characters to be entered. Here, however, the entered characters partially sticking out of the guide lines or character frames can still be recognized in this case.

Figure 12:
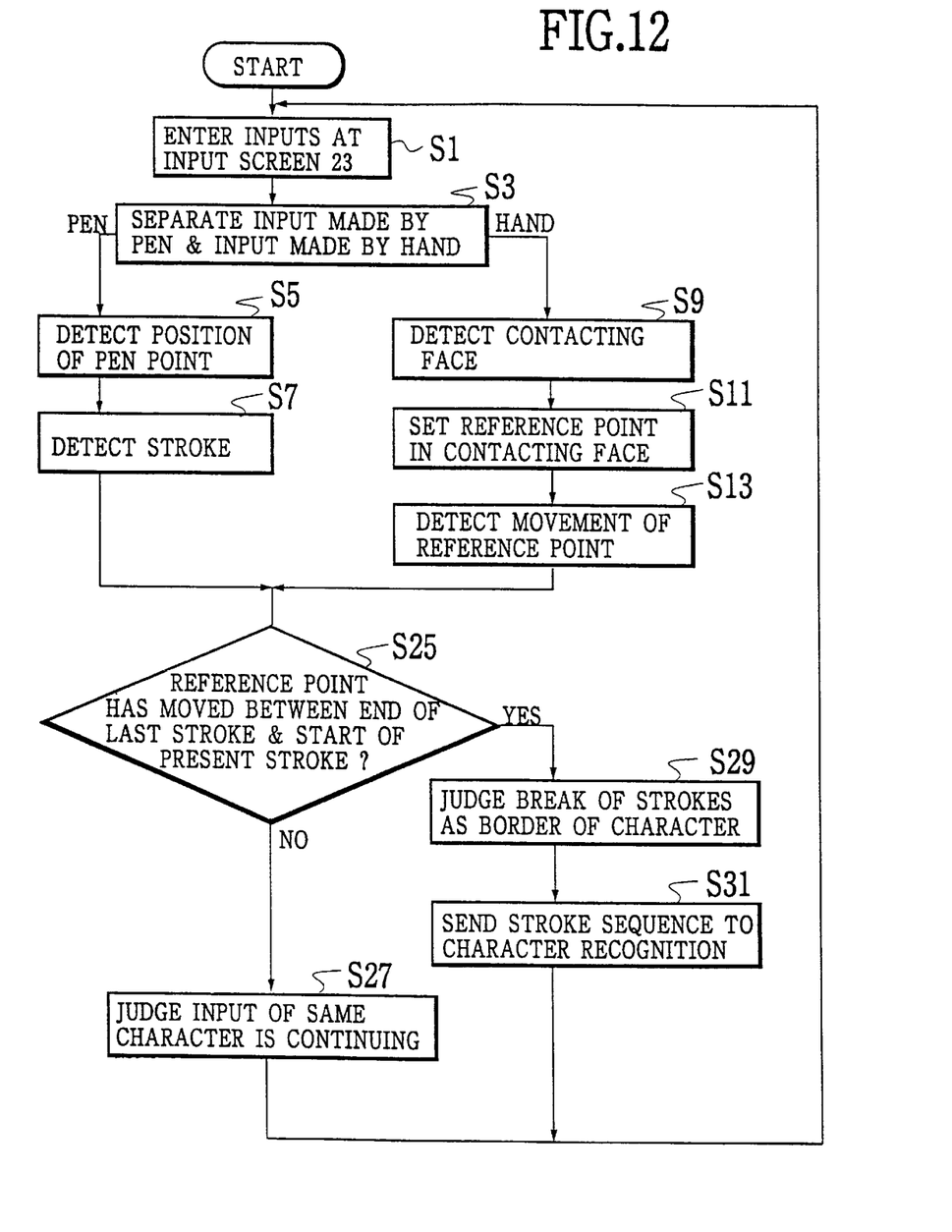
FIG. 12 is a flow chart of a procedure for detecting a border of a character in the pen input type electronic device of FIG. 2.

It is further to be noted that the above described operation according to the flow chart of FIG. 12 may also be utilized in detecting the border of word instead of detecting the border of character as described above, especially in a case of using the input in script.

Next, another application of the input apparatus of the first embodiment described above for the recognition of the entered input character containing the noise component according to the input movement monitoring data will be described.

Figure 13A:
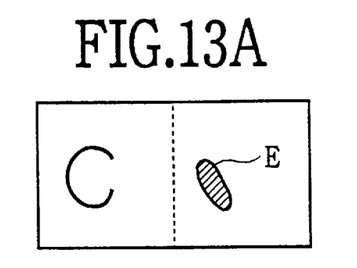
FIGS. 13A, 13B, 13C, and 13D are illustrations of exemplary states of entered inputs at various stages in the procedure of FIG. 12.
Figure 13B:
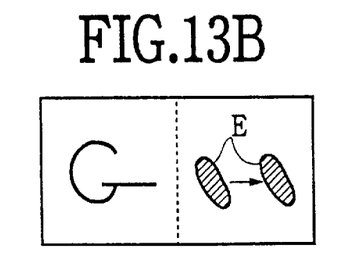
Figure 13C:
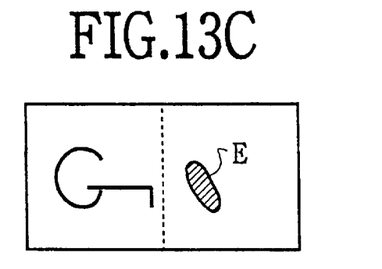
Figure 13D:
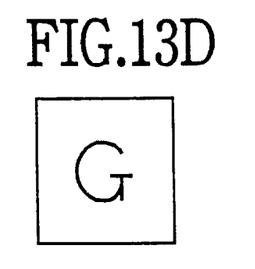

Namely, in the conventional character recognition, the pen strokes are regarded as the time series of the absolute coordinates on the input screen 23. In this scheme, when some noise component is introduced in a middle of the stroke, it has been impossible to cancel out the noise component and recognize the entered input character correctly. For example, in a case of intending to enter the character "G" as shown in FIG. 13D, while entering the second stroke after the first stroke has entered as shown in FIG. 13A, when the input screen has suddenly displaced sideways such that the entered input character appears as shown in FIG. 13B, it has conventionally been impossible to correctly recognize the entered input character even when the entering of the second stroke is completed as shown in FIG. 13C.

In this regard, the input apparatus according to the first embodiment described above can be utilized by regarding the displacement of the reference point during the entering of one and the same stroke as the noise component, according to the position of the reference point monitored at the input movement monitoring unit 3 of FIG. 1.

Figure 14:
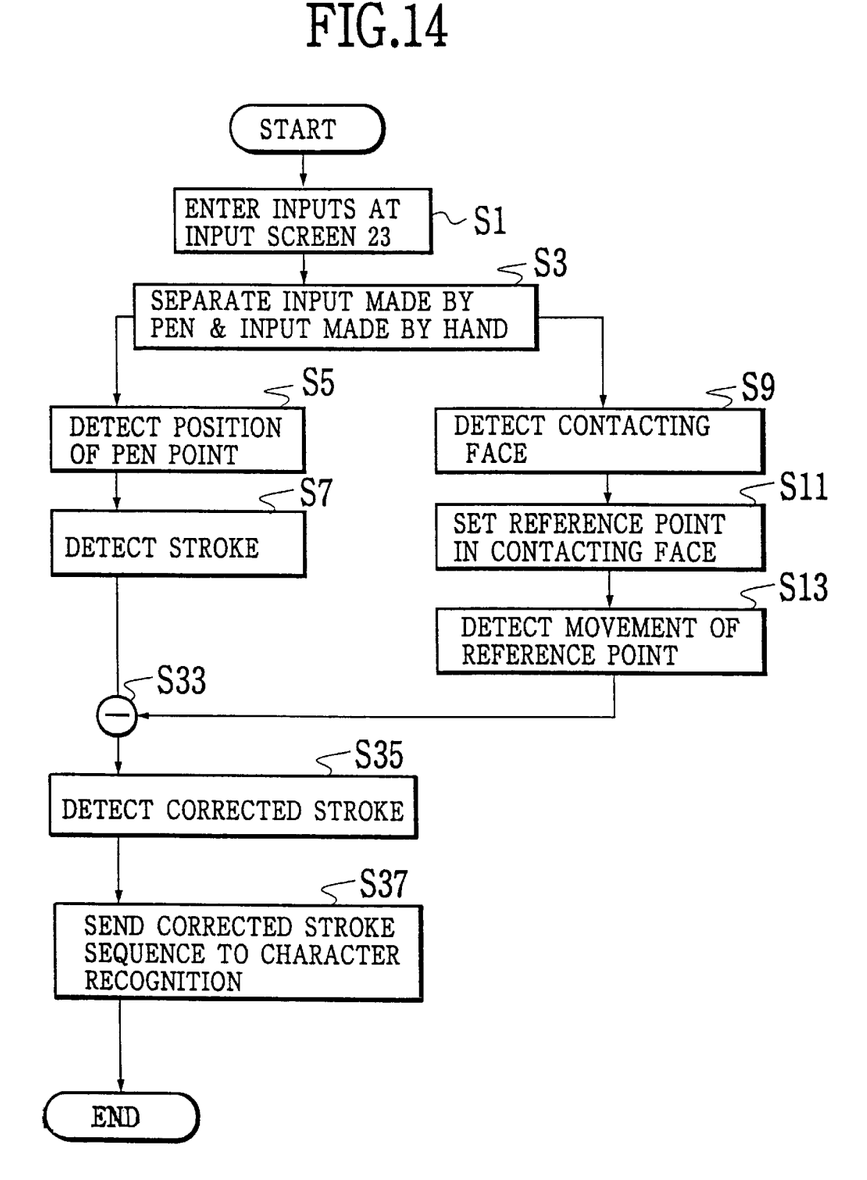
FIG. 14 is a flow chart of a procedure for detecting a corrected pen stroke in the pen input type electronic device of FIG. 2.

In this case, the input apparatus of the first embodiment can be adapted to operate according to the flow chart of FIG. 14 as follows. Here, the steps S1 to S13 are identical to those in the flow chart of FIG. 10, so that their description will be omitted.

After the steps S7 and S13, the displacement of the reference point obtained at the step S13 is subtracted from the stroke detected at the step S7 (step S33) by expressing the stroke in terms of the relative coordinates with respect to the reference point and regarding the displacement of the reference point during the entering of one and the same stroke as the noise component. Then, the corrected stroke is detected according to the result of the subtraction (step S35), and the corrected stroke sequence is sent to the character recognition process (step S37).

In the above described exemplary case of entering the character "G", the position of the contacting face E is fixed in FIGS. 13A and 13B, but there is a period in which it has moved for the same amount in the same direction as the pen point in FIG. 13B. In the relative coordinates expression, the movement of the pen point during this period is ignored and not detected as a part of the entered stroke, so that the entered input character can be recognized correctly as shown in FIG. 13D when the entering of the second stroke is completed as shown in FIG. 13C.

Such a circumstance arises not only when the input screen has suddenly moved, but also when the input character is entered without watching the pen stroke or the input character is entered in the dark environment. Moreover, for the user who is handicapped in eye sight, it has been impossible to take the full advantages of the convenience of the pen input type electronic device as it has been impossible for such a user to visually check the balance between the relative positions of the strokes. However, by using the above described application of the input apparatus according to the first embodiment, it becomes sufficient for the user to write the character with reference to the position of his own hand and there is no need to secure the good balance between the relative positions of the strokes, so that the satisfactory handling of the pen input type electronic device can be enjoyed even by the user who is handicapped in eye sight or under the dark environment.

Next, the second embodiment of the input apparatus suitable for a portable electronic device according to the present invention will be described in detail.

Figure 15:
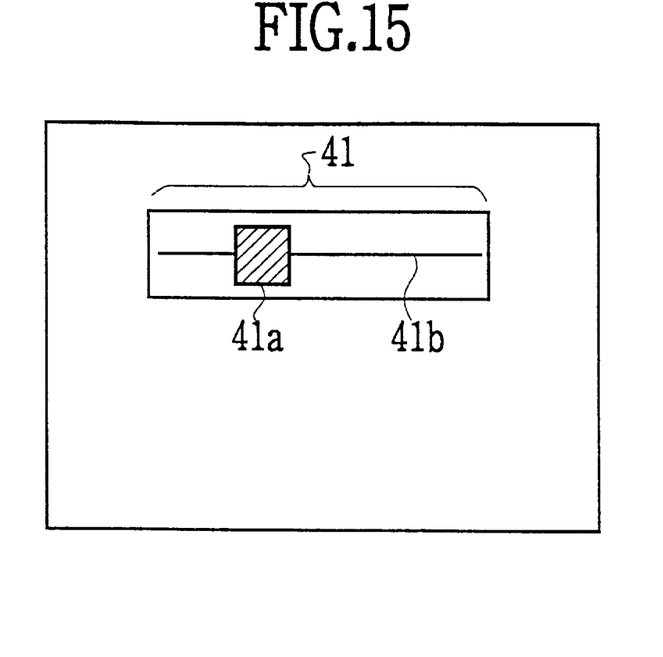
FIG. 15 is an illustration of a slide control for a portable electronic device to which the second embodiment of an input apparatus according to the present invention can be applied.

This second embodiment concerns with a case of a slide control type portable electronic device. Here, as shown in FIG. 15, the slide control includes a control portion 41 in which a slider knob 41a can be slid along a predetermined sliding groove 41b such that the position of the slider knob 41a along the sliding groove 41b indicates the input content.

In the conventional slide control type electronic device, at a time of the input, only the significant movement component along the sliding groove 41b has been extracted as the input data regardless of the circumstance in which the slider knob 41a has been operated. As a result, even when the unintentional erroneous input operation of the slider knob 41a is made due to the vibration during the input operation, the movement component along the sliding groove 41b has been extracted from this erroneous input operation and entered as the valid input.

Figure 16:
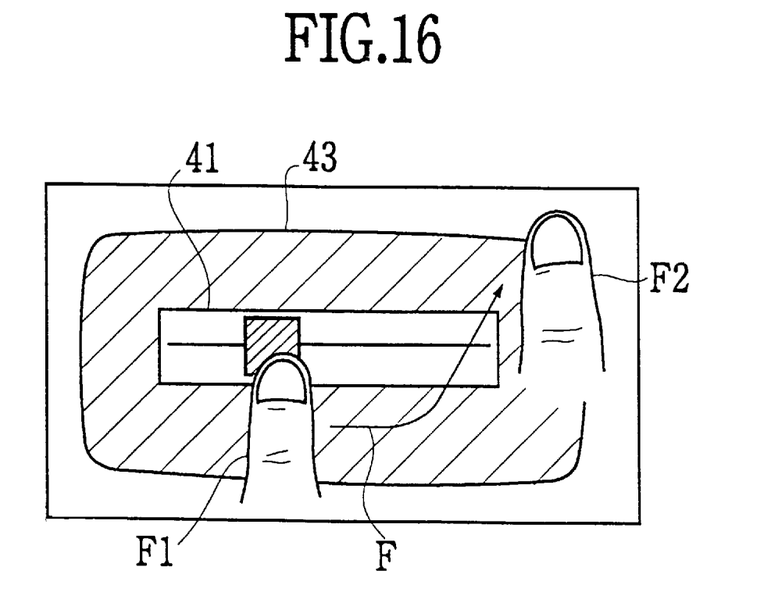
FIG. 16 is an illustration of a slide control portion in the second embodiment of an input apparatus according to the present invention.

For example, as shown in FIG. 16, the erroneous input operation can be made in a case the operation of the slider knob 41a has started from a position F1, and then the finger has moved along the arrow F toward the upper right corner to a position F2 during this input operation. As in this example, the erroneous input operation can be characterized as it contains the movement component for trying to operate the slider knob 41a in a direction into which the slider knob 41a cannot be moved, or as it contains the movement component for trying to move the slider knob 41a beyond its movable range. Therefore, by detecting such movement components, it becomes possible to judge the entered input as that entered by the erroneous input operation.

To this end, in this second embodiment, as shown in FIG. 16, there is provide an input operation monitoring unit 43 in the surrounding of the control portion 41. In the normal input operation, the user does not touch the input operation monitoring unit 43, so that the input operation in which the user touches the input operation monitoring unit 43 can be judged as the erroneous input operation, and cancelled while the position of the slider knob 41a is returned to the original position before the erroneous input operation was made.

Figure 17:
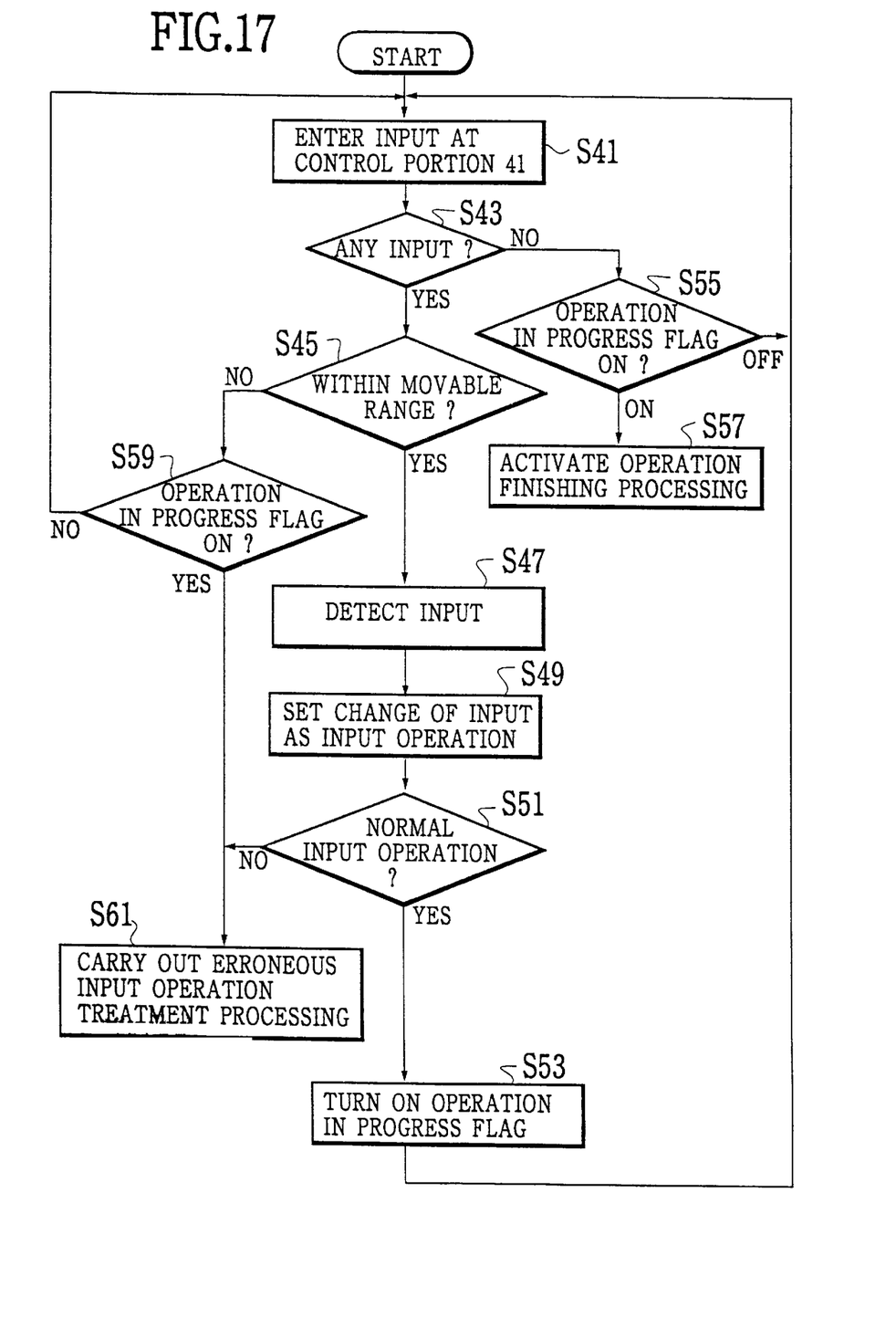
FIG. 17 is a flow chart of a procedure for detecting an erroneous input operation at the slide control portion of FIG. 16.

In this case, the input apparatus of the second embodiment operates according to the flow chart of FIG. 17 as follows.

First, the inputs are entered on the control portion 41 (step S41), and whether any input have been entered or not is judged (step S43). If not, whether an operation in progress flag is ON or not is judged (step S55), and if not, the prescribed Input operation finishing processing is activated (step S57), whereas otherwise it returns to the step S41.

When there is an entered input, whether it is within the movable range of the slider knob 41a or not is judged (step S45). If not, whether an operation in progress flag is ON or not is judged (step S59), and if not, it returns to the step S41, whereas otherwise it proceeds to the step S61 described below.

Then, the entered input data are detected (step S47), and the change of the entered input is set as the input operation (step S49). Then, whether the input operation obtained at the step S49 is a normal operation or not is determined (step S51). If so, the operation in progress flag is turned into ON (step S53) and the process returns to the step S41, whereas otherwise the predetermined erroneous input operation treatment processing is carried out (step S61).

It is to be noted that the slide control in a form of a control portion 41 including the slider knob 41a and the sliding groove 41b may not necessarily the physical slide control in a physical configuration of the control portion 41, and can be a virtual side control given in an image of the control portion 41 displayed on the display.

Next, the third embodiment of the input apparatus suitable for a portable electronic device according to the present invention will be described in detail.

This third embodiment concerns with a case of a button control type portable electronic device. Here, as shown in FIG. 18, the button control portion 54 includes a plurality of independent control buttons 54a, 54b, and 54c, while the input portion 51 for entering the handwriting characters or figures is substantially similar to the input screen 23 of the first embodiment described above.

In such a button control type portable electronic device equipped with a plurality of independent control buttons, there are cases in which the hand of the user accidentally touches the button control portion 54 while operating the input portion 51 so as to cause the erroneous input operation. In order to avoid such an erroneous input operation, it has conventionally been necessary for the user to enter the handwriting inputs at the input portion 51 while being careful not to touch any part of the control portion 54. As a consequence, in a case the right handed user uses the electronic device having the control portion 54 on the right side of the input portion 51 as shown in FIG. 18, it has conventionally been necessary for the user to lift his right hand holding the pen so as not to touch the control portion 54 by hand while keeping the pen point in contact with the input portion 51. However, as already mentioned above, it is possible to enter the inputs more stably when the hand holding the pen is also put on the input portion 51. Therefore, it is convenient to make the control portion 54 such that the inputs at the control portion 54 are not accepted while entering the inputs at the input portion 51 even when some part of the control portion 54 is touched by hand.

Figure 18:
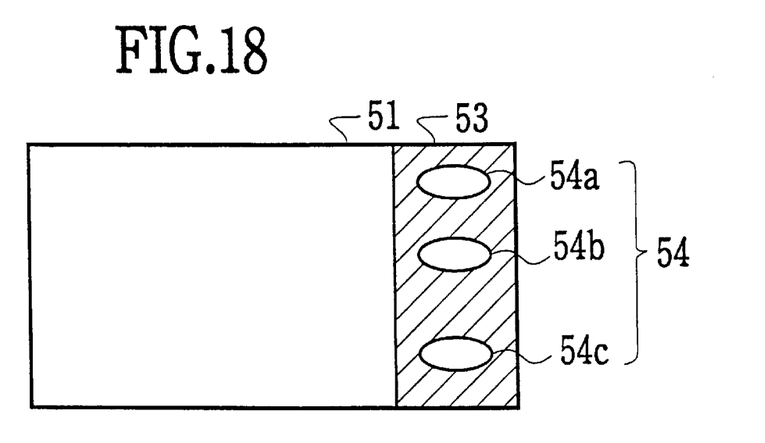
FIG. 18 is an illustration of an input screen portion and a button control portion in the third embodiment of an input apparatus according to the present invention.
Figure 19:
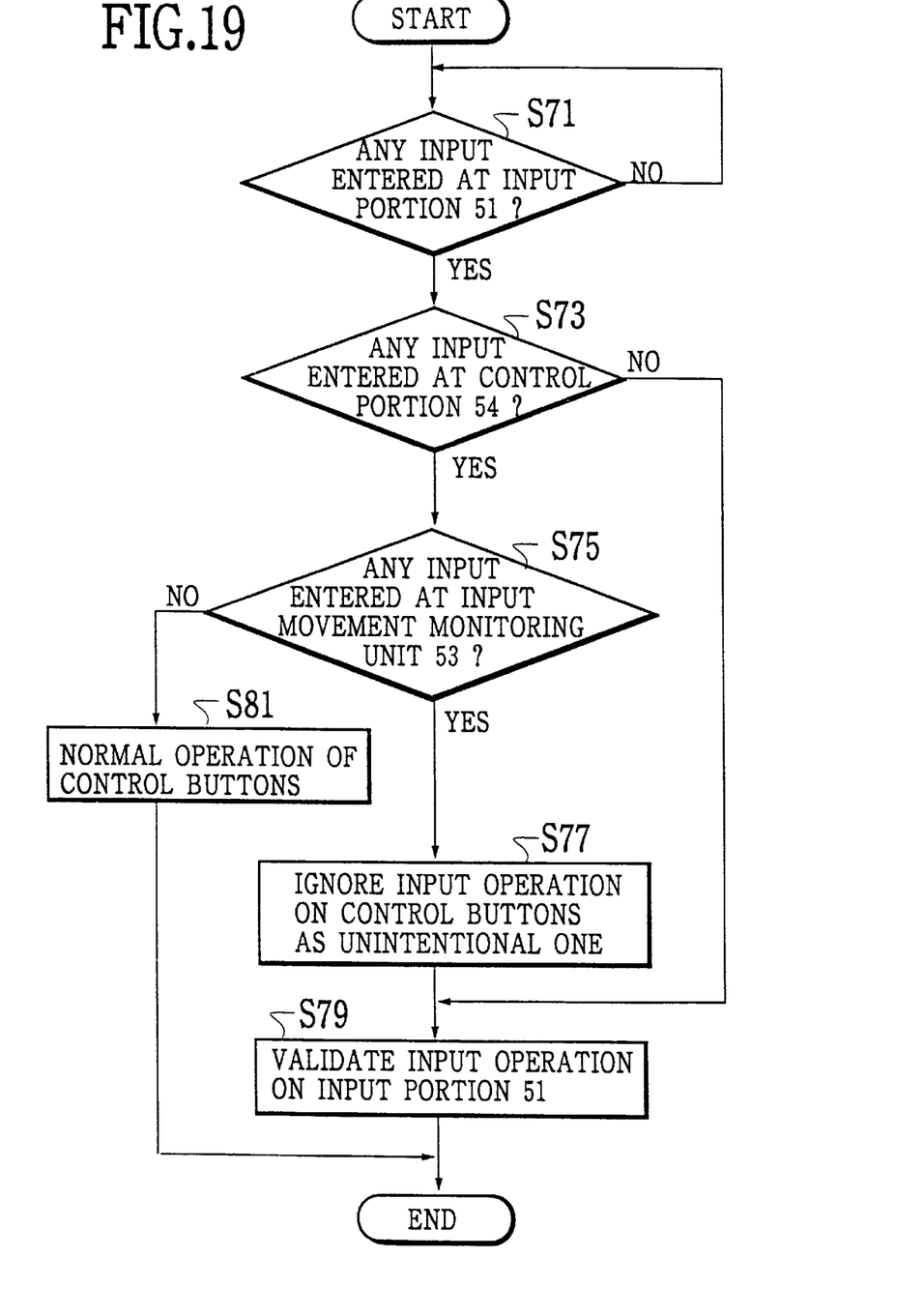
FIG. 19 is a flow chart of a procedure for detecting an erroneous input operation at the button control portion of FIG. 18.

To this end, in this third embodiment, as shown in FIG. 18, there is provide an input operation monitoring unit 53 in the surrounding of the control portion 54, such that the inputs entered at the control portion 54 by the touching on any of the control buttons during the operation of the input portion 51 or immediately thereafter are ignored.

In this case, the input apparatus of the third embodiment operates according to the flow chart of FIG. 18 as follows.

First, whether there is any input entered at the input portion 51 or not is judged (step S71), and when it is judged that there is an input at the input portion 51, whether there is any input entered at the control portion 54 or not is judged (step S73). If not, it proceeds to the step S79 described below, whereas otherwise whether there is any input entered at the input movement monitoring unit 53 or not is judged (step S75). If not, the input operation made on the control buttons is regarded as a normal input operation on the control portion 54 and the appropriate processing of the normal input operation on the control portion 54 is carried out (step S81), whereas otherwise the input operation made on the control buttons is regarded as unintentional erroneous one and therefore ignored (step S77) while the input operation made on the input portion 51 is validated (step S79).

It is to be noted that the button control in a form of the control portion 54 including a plurality of independent control buttons 54a, 54b, and 54c may not necessarily the physical button control in a physical configuration of the control portion 54, and can be a virtual button control given by an image of the control portion 54 displayed on the display.

As described, according to the input apparatus according to the present invention, it becomes possible to provide an input apparatus suitable for a portable electronic device capable of detecting the unintentional erroneous input operations and separating the intended correct input operations effectively, so that the potential for utilizing the portable type electronic device can be increased considerably.

Moreover, there is no need for the user to activate any erroneous input operation treatment processing himself, so that the burden on the user can be reduced and the handling of the electronic device can be improved.

It is to be noted that, although the embodiments described above are primarily concerned with a case of dealing with the handwriting input characters, it is equally possible to utilize the input apparatus according to the present invention for the other types of the inputs such as the figures and the images.

It is also possible to utilize the input movement monitoring data obtained by the input apparatus according to the present invention for the purpose of controlling the electronic device, apart from the detection of the erroneous input operation as described above. For example, during the input operation of the handwriting input character, it is possible to set up a rule that the storing of the entered input character into a memory can be initiated by the lifting of the hand holding the pen off the input screen such that the user can control the operation for storing the entered input character.

Similarly, it is also possible to set up a rule that the line change during the input operation of the handwriting input characters can be specified by the double taps of the input screen by the hand holding the pen, such that the user can control the line change timing without operating any control button for specifying the line change such as a return key. Here, the double taps of the input screen by the hand may be assigned to any desired frequently used command other than that of the line change, such as the saving in the non-volatile memory for example.

It is also possible to utilize the input movement monitoring data obtained by the input apparatus according to the present invention for the purpose of automatic power OFF control by setting up a rule that the power of the electronic device is automatically turned OFF when the hand is lifted off the input screen for more than a prescribed period of time continuously.

It is also possible to modify the input apparatus according to the present invention as described above in such a manner that the input movement monitoring data are acquired from the parts of the user other than the hand holding the pen placed on the input screen. For instance, the movement or the orientation of the other hand supporting the portable type electronic device body may be detected as the input movement monitoring data indicating the state of the user at a time of the input operation.

It is also to be noted that besides those already mentioned above, many modifications and variations of the above embodiments may be made without departing from the novel and advantageous features of the present invention. Accordingly, all such modifications and variations are intended to be included within the scope of the appended claims.

What is claimed is:

1. An input apparatus for entering inputs into a portable electronic device, comprising:
   input means for allowing a user to enter inputs by a prescribed input operation;
   input movement monitoring means for monitoring a movement of the user at a time of the input operation; and
   processing means for processing the inputs entered into the portable electronic device by the user using the input means at a time of the input operation, according to the input operation made by the user at the input means and the movement of the user monitored by the input movement monitoring means, to obtain processed input data appropriate for the portable electronic device.

2. The input apparatus of claim 1, wherein the processing means processes the inputs entered at the input means according to a correlation between the input operation made by the user at the input means and the movement of the user monitored by the input movement monitoring means.

3. The input apparatus of claim 1, wherein the input movement monitoring means monitors the movement of the user related to the input operation.

4. The input apparatus of claim 1, wherein the input means includes a pen to be held by a hand of the user and a screen on which the user can enter handwriting inputs by using the pen, and the input movement monitoring means is located in a vicinity of the screen so as to monitor the movement of the hand of the user holding the pen which is put on the screen.

5. The input apparatus of claim 4, wherein the processing means cancels the inputs entered at the input means while the input movement monitoring means is detecting the movement of the hand of the user during the input operation.

6. The input apparatus of claim 4, wherein the processing means cancels the inputs entered at the input means while the input movement monitoring means is detecting the movement of the hand of the user during the input operation in a direction substantially identical to a direction of a movement of a pen point of the pen held by the hand of the user.

7. The input apparatus of claim 4, wherein the input movement monitoring means comprises an array of pressure sensors provided in superposition to the screen, which detect positions of the pen and the hand holding the pen on the screen.

8. The input apparatus of claim 7, wherein the array of pressure sensors detect the position of the pen as an isolated pressure point, and the position of the hand holding the pen as a distribution of mutually neighboring pressure points.

9. The input apparatus of claim 7, wherein each pressure sensor constituting the array of pressure sensors is a two-value pressure sensor for detecting presence/absence of a pressure exerted thereon.

10. The input apparatus of claim 7, wherein each pressure sensor constituting the array of pressure sensors is a multi-value pressure sensor for detecting a multi-valued pressure level of a pressure exerted thereon.

11. The input apparatus of claim 7, wherein the input movement monitoring means further comprises an array of temperature sensors provided in superposition to the screen and the array of pressure sensors, which detect a body temperature of the hand holding the pen on the screen so as to distinguish the hand and the pen.

12. The input apparatus of claim 4, wherein the input movement monitoring means also monitors the movement of a position of the hand of the user at a period between the input operations for successive strokes of the pen, and the processing means processes the successive strokes entered at the input means as different characters when the input movement monitoring means detects the movement of the position of the hand of the user at the period between the input operations for the successive strokes of the pen, and processes the successive strokes entered at the input means as parts of a single character when the input movement monitoring means fails to detect the movement of the position of the hand of the user at the period between the input operations for the successive strokes of the pen.

13. The input apparatus of claim 4, wherein the input movement monitoring means also monitors a displacement of a position of the hand of the user during the input operation for each stroke of the pen, and the processing means processes said each stroke by subtracting the displacement detected by the input movement monitoring means from said each stroke entered at the input means.

14. The input apparatus of claim 1, wherein the input means includes a slide control formed by a slider knob to be slid along a prescribed sliding groove by a hand of the user, and the input movement monitoring means monitors the movement of the hand of the user sliding the slider knob.

15. The input apparatus of claim 14, wherein the processing means cancels the inputs entered at the input means while the input movement monitoring means is detecting any one of the movement of the hand of the user beyond a movable range of the slider knob and the movement of the hand of the user in a direction in which the slider knob is not movable.

16. The input apparatus of claim 14, wherein the input movement monitoring means is provided around the sliding groove and the processing means cancels the inputs entered at the input means while the input movement monitoring means is detecting a touching of the input movement monitoring means by the hand of the user during the input operation.

17. The input apparatus of claim 1, wherein the input means includes a button control formed by a plurality of control buttons to be pressed by a hand of the user for entering button control inputs and a screen on which the user can enter handwriting inputs, the input movement monitoring means is provided around the control buttons, and the processing means cancels the button control inputs entered at the control buttons while the input movement monitoring means is detecting a touching of the input movement monitoring means by the hand of the user during the input operation of the handwriting inputs on the screen.

18. The input apparatus of claim 1, wherein the processing means controls an operation of the electronic device according to the movement of the user detected by the input movement monitoring means which is in a prescribed form indicating a control command.

19. The input apparatus of claim 1, wherein the input means and the input movement monitoring means are commonly provided and include a pen to be held by a hand of the user and a screen on which the user can enter handwriting inputs by using the pen, which is equipped with an array of pressure sensors provided for detecting positions of the pen and the hand holding the pen on the screen.

20. A method for entering inputs into a portable electronic device, comprising the steps of:

allowing a user to enter inputs by a prescribed input operation;

monitoring a movement of the user at a time for the input operation; and processing the inputs entered into the portable electronic device by the user at a time of the input operation at the allowing step, according to the input operation made by the user at the allowing step and the movement of the user monitored by at the monitoring step, to obtain processed input data appropriate for the portable electronic device.

21. A portable electronic device, comprising:

data input means for entering data into the portable electronic device, including:

input means for allowing a user to enter inputs by a prescribed input operation;

input movement monitoring means for monitoring a movement of the user at a time of the input operation; and processing means for processing the inputs entered into the portable electronic device by the user using the input means at a time of the input operations according to the input operation made by the user at the input means and the movement of the user monitored by the input movement monitoring means, to obtain processed input data appropriate for the portable electronic device; and data processing means for processing the appropriately processed input data entered from the data input means.

* * * * *